US012298079B1

(12) United States Patent
Leber et al.

(10) Patent No.: US 12,298,079 B1

(45) Date of Patent: May 13, 2025

(54) SYSTEMS AND METHODS FOR COOLING IN A FURNACE

(71) Applicant: Inteco PTI, LLC, Tucker, GA (US)

(72) Inventors: Martin Leber, Tucker, GA (US); Ryan Boardman, Tucker, GA (US); Ashish Kotwal, Tucker, GA (US); Connor Kirk, Tucker, GA (US)

(73) Assignee: Inteco PTI, LLC, Tucker, GA (US)

(*) Notice: Subject to any disclaimer, the term of this patent is extended or adjusted under 35 U.S.C. 154(b) by 0 days.

(21) Appl. No.: 18/921,675

(22) Filed: Oct. 21, 2024

Related U.S. Application Data

(60) Provisional application No. 63/650,977, filed on May 23, 2024.

(51) Int. Cl.
*F27D 9/00* (2006.01)

(52) U.S. Cl.
CPC ........ *F27D 9/00* (2013.01); *F27D 2009/0002* (2013.01)

(58) Field of Classification Search
CPC ...... F27D 9/00; F27D 2009/0002; F27B 3/20; F27B 3/205; F27B 3/225; F27B 3/24; C21C 5/5217; F23C 5/00; F23C 5/02; F23C 5/08
See application file for complete search history.

(56) References Cited

U.S. PATENT DOCUMENTS 6,289,035 B1 * 9/2001 Shver .................... H05B 7/185 373/66
10,955,135 B2 3/2021 Ferguson
11,300,291 B2 4/2022 Kovacic
11,619,450 B2 4/2023 Ferguson
2004/0174920 A1 * 9/2004 Popenov .................. F27B 3/24 373/63
2007/0211780 A1 * 9/2007 Shver ........................ F27B 3/24 373/76
2007/0267787 A1 * 11/2007 Higgins .................. F27B 3/205 266/190
2009/0245319 A1 * 10/2009 Higgins .................... F23C 5/02 373/71
2012/0224601 A1 * 9/2012 Eyfa ....................... F27B 3/085 29/428
2013/0032978 A1 * 2/2013 Glass .................. F27D 99/0033 266/241

(Continued)

*Primary Examiner* — Hung D Nguyen

(74) *Attorney, Agent, or Firm* — TROUTMAN PEPPER LOCKE LLP; James E. Schutz; Korbin M. Blunck

(57) ABSTRACT

The disclosed technology includes a burner panel including an outer enclosure having an outer surface and an inner surface and a burner enclosure disposed at least partially within the outer enclosure and having an outer surface and an inner surface, wherein the outer surface of the burner enclosure and the inner surface of the outer enclosure define a cooling cavity. The burner panel can further include a cooling system disposed at least partially within the cooling cavity, the cooling system including a cooling fluid piping system in fluid communication with a cooling fluid inlet and one or more discharge openings comprising a slotted extension protruding from the cooling fluid piping system and defining a slot-shaped tube in fluid communication with the cooling fluid piping system, the one or more discharge openings configured to discharge a cooling fluid on at least a portion of the inner surface of the outer enclosure.

1 Claim, 7 Drawing Sheets

(56) References Cited

U.S. PATENT DOCUMENTS

| | | | | |
|---|---|---|---|---|
| 2014/0265067 | A1* | 9/2014 | Eyfa | F27D 9/00<br>266/46 |
| 2018/0298758 | A1* | 10/2018 | Cunningham | F01D 25/14 |
| 2018/0313537 | A1* | 11/2018 | Kovacic | F23D 14/78 |
| 2019/0383484 | A1 | 12/2019 | Ferguson | |

* cited by examiner

SYSTEMS AND METHODS FOR COOLING IN A FURNACE

CROSS-REFERENCE TO RELATED APPLICATIONS

The Application claims priority under 35 U.S.C. § 119(e), of U.S. Provisional Patent Application No. 63/650,977 filed May 23, 2024, the entire contents and substance of which are incorporated herein by reference in its entirety as if fully set forth below.

TECHNICAL FIELD

The present invention relates generally to a method and apparatus used in metal melting, refining and processing, and more particularly, a method and apparatus for cooling combustion devices in a metal melting furnace.

BACKGROUND

Electric are furnaces (EAFs) make steel by using an electric are to melt one or more charges of scrap metal, hot metal, iron-based materials, or other meltable materials, which is placed within the furnace. Modern EAFs may also make steel by melting DRI (direct reduced iron) combined with the hot metal from a blast furnace. In addition to the electrical energy of the arc, chemical energy is provided by auxiliary burners using fuel and an oxidizing gas to produce combustion products with a high heat content to assist the arc.

If the EAF is used as a scrap melter, the scrap burden is charged by dumping it into the furnace through the roof opening from buckets, which also may include charged carbon and slag forming materials. A similar charging method using a ladle for the hot metal from a blast furnace may be used along with injection of the DRI to produce the burden. Additionally, these materials could be added through other openings in the furnace.

In the melting phase, the electric arc and burners melt the burden into a molten pool of metal, termed an iron carbon melt, which accumulates at the bottom or hearth of the furnace. Typically, after a flat bath has been formed by melting of all introduced burden, the electric arc furnace enters a refining and/or decarburization phase. In this phase, the metal continues to be heated by the arc until the slag forming materials combine with impurities in the iron carbon melt and rise to the surface as slag. During the heating of the iron carbon melt, it reaches the temperature and conditions when carbon in the melt combines with oxygen present in the bath to form carbon monoxide bubbles. Generally, flows of oxygen are blown into the bath with either lances or burner/lances to produce a decarburization of the bath by the oxidation of the carbon contained in the bath.

A furnace must reach very high temperatures to melt burden into molten metal. For example, scrap steel melts at approximately 2800° F. Additionally, it is typically desirable to raise the temperature of the melt sufficiently above the melting point (typically to 2950° F.-3050° F.) to allow the melt to be transferred from the furnace to a desired location and further processed without prematurely solidifying. In addition to melting the scrap, the electric arc and molten burden can damage the furnace itself as well as any devices placed inside the furnace, such as burners, lances, and enclosures for burners and lances.

To combat heat related problems, furnace and furnace component designers generally use water cooled devices and panels. Such devices and panels use a constant flow of cooling fluid through the devices, close to the surfaces that are exposed to heat, to help dissipate the heat. The cooling fluid thus cools the panels, from the inside, and lowers the temperature of the device.

Most fluid cooled devices use a serpentine arrangement to direct water through the device. While such arrangements are often effective at cooling furnace components, they are not sufficiently efficient and often allow hot spots to develop. One reason why a serpentine arrangement is not efficient is that as the water flows through the device, small bubbles often form along the walls of the water pipes. These bubbles can insulate a portion of the pipe and prevent the water from cooling the device sufficiently.

Within a cooling pipe, cooling fluid generally moves most rapidly and turbulently through the center of the pipe, and likewise it moves less rapidly and less turbulently along the walls of the pipe. Those skilled in the art may be familiar with the Reynolds number of a flow. The Reynolds number is indicative of the turbulence of the fluid. A low Reynolds number indicates that the fluid flow is laminar and a high Reynolds number indicates that the fluid flow is turbulent. In cooling operations, it is desirable for the fluid flow to be turbulent and thus a high Reynolds number is desired. Often, the turbulence of the fluid along the pipe wall is low even when the overall fluid flow through the pipe is high. One solution to solving this problem is to place material along the wall in the pipe to partially obstruct the flow and to increase the turbulence of the fluid along the pipe wall. While this solution may improve the turbulence of the fluid in a location, it may cause other areas of low turbulence to form.

Another remedy to this problem is to increase the velocity and turbulence of the water by increasing the flow of water through the pipe. This may help wash away the bubbles, but it requires significantly higher water flow and pressure, thereby increasing the cost of operations.

Further, certain portions of a furnace device may experience greater heat effects than other portions of the device. The serpentine structure does not allow a furnace device to receive more cooling in one area than another. Rather, the same force of water flows through all sections of the serpentine.

Further, the cooling fluid in a conventional circulated cooling pipe systems is typically at a high pressure due to the flow rate and water pressure necessary to meet cooling demands and the exposure to furnace heat. This high-pressure cooling fluid circuit creates safety issues as a leak, crack, or breaking of the cooling piping can create an explosive reaction where high-pressure fluid escapes and further comes in contact with the extremely high temperatures in and around the furnace creating steam.

Therefore, there is a need to provide a method and apparatus for cooling furnace devices that allows cooling fluid to be directed to specific portions of the furnace device at low and/or atmospheric pressure.

SUMMARY

The present invention provides an apparatus for cooling furnace devices that overcomes the deficiencies of the prior art. Preferably, the present invention provides efficient and effective cooling of burners, lances, and related enclosures used in making steel in an electric arc furnace. There is provided, in accordance with an example of the disclosed technology a burner panel. The burner panel can include an outer enclosure having an outer surface and an inner surface. The burner panel can include a burner enclosure disposed at least partially within the outer enclosure. The burner panel can include an outer surface and an inner surface. The outer surface of the burner enclosure and the inner surface of the outer enclosure can define a cooling cavity. The burner panel can include a cooling system disposed at least partially within the cooling cavity. The cooling system can include a cooling fluid piping system. The cooling fluid piping system can be in fluid communication with a cooling fluid inlet. The cooling system can include one or more discharge openings. The one or more discharge openings can include a slotted extension protruding from the cooling fluid piping system and defining a slot-shaped tube in fluid communication with the cooling fluid piping system. The one or more discharge openings can be configured to discharge a cooling fluid on at least a portion of the inner surface of the outer enclosure. The burner panel can include a drain. The burner panel can include a cooling fluid retention system in fluid communication with the drain. The cooling fluid discharged by the one or more discharge openings can flow out of the cooling cavity through the drain to the cooling fluid retention system. The burner panel can include a burner disposed at least partially within the burner enclosure. The burner can include a combustion chamber. The burner can include a fuel inlet. The burner can include an oxygen inlet.

BRIEF DESCRIPTION OF THE FIGURES

Reference will now be made to the accompanying figures, which are not necessarily drawn to scale, and wherein.

DETAILED DESCRIPTION

Figure 1A:
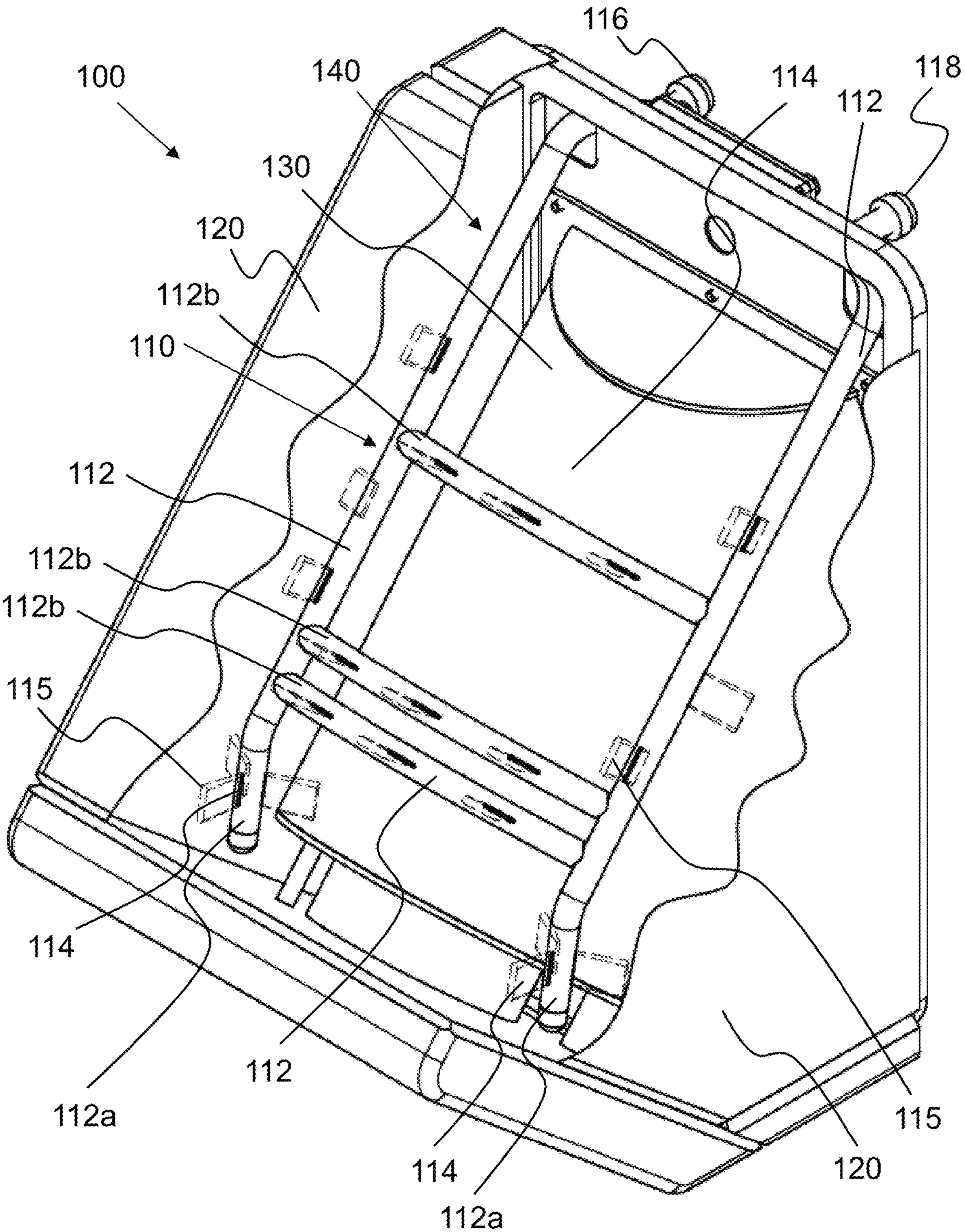
FIG. 1A is a cutaway view of a burner panel, in accordance with an example embodiment of the presently disclosed subject matter.
Figure 1B:
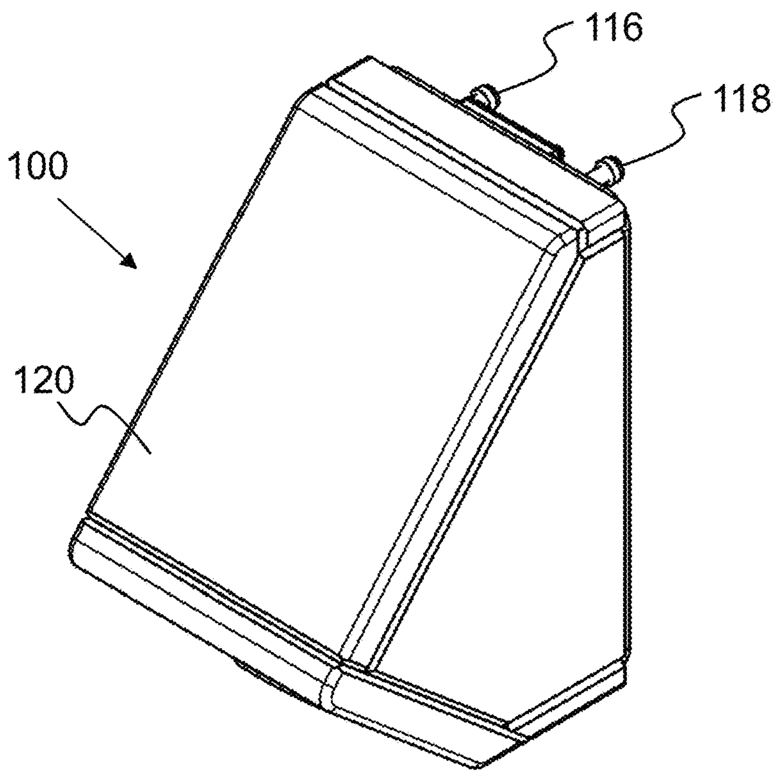
FIG. 1B is a perspective view of a burner panel, in accordance with an example embodiment of the presently disclosed subject matter.
Figure 1C:
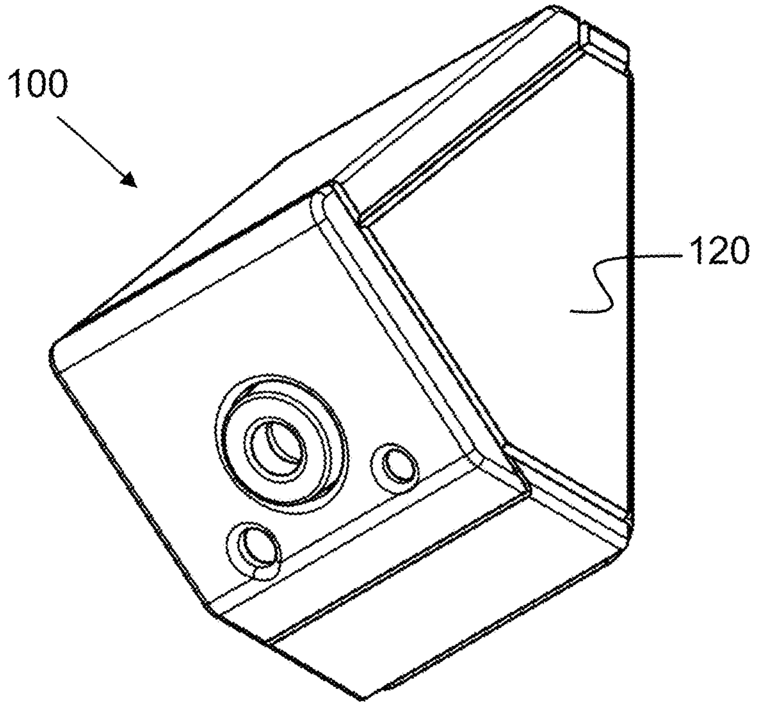
FIG. 1C is a perspective view of a burner panel, in accordance with an example embodiment of the presently disclosed subject matter.
Figure 1D:
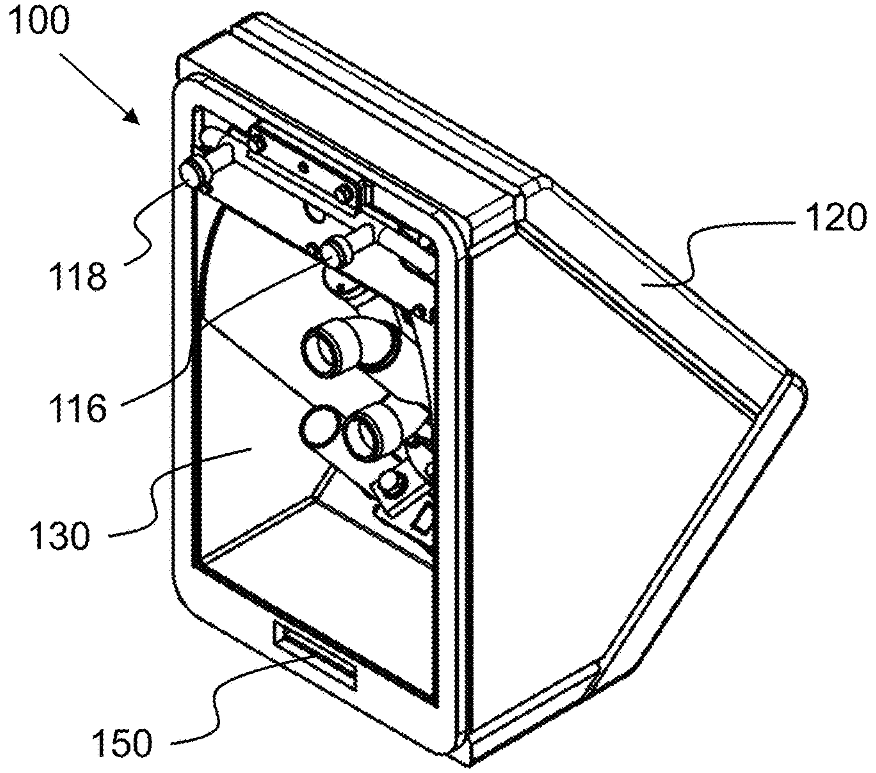
FIG. 1D is a perspective view of a burner panel, in accordance with an example embodiment of the presently disclosed subject matter.
Figure 1E:
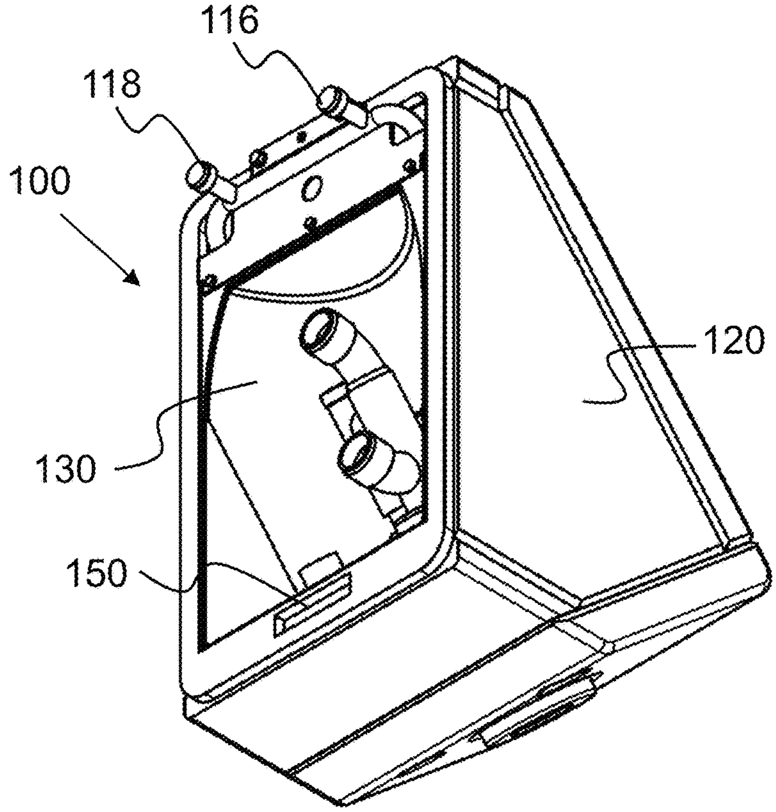
FIG. 1E is a perspective view of a burner panel, in accordance with an example embodiment of the presently disclosed subject matter.

Embodiments of the disclosed technology include a burner panel having a cooling system. For example, the disclosed technology can include a cooling system for use with burner panels such as the JetBox from Ineco PTI. This includes aspects of the JetBox technology described in U.S. Pat. Nos. 6,614,831; 6,289,035; 6,805,724; 7,491,360; and 7,858,018 which are each incorporated herein by reference in their entirety. The disclosed technology can further include the Low Pressure JB from Inteco PTI. Because the burner panel is subjected to extreme heat, it may need to be cooled to protect the burner panel and ensure the continued proper operation of the burner. In various embodiments, the cooling system may include piping that is run throughout an interior cavity of the burner panel and configured to deliver cooling fluid, such as water, to the burner panel from an external cooling fluid source. In various embodiments, the cooling system may further include a plurality of discharge openings in the piping that are configured to discharge or expel the cooling fluid on interior surfaces of the burner panel to cool the burner panel.

Throughout the present description, the present invention will be discussed as it is installed in a burner panel. However, those of ordinary skill in the art will recognize that the principles of the present invention may be applied to various devices used in a furnace, or other high temperature environment, that require cooling. In particular, it is noted that the present invention may be used in burners, lances, and enclosures for burners and lances, as well as any other device now used or later developed for use in a furnace.

The present disclosure can be understood more readily by reference to the following detailed description of example embodiments and the examples included herein. Before the example embodiments of the devices and methods according to the present disclosure are disclosed and described, it is to be understood that embodiments are not limited to those described within this disclosure. Numerous modifications and variations therein will be apparent to those skilled in the art and remain within the scope of the disclosure. It is also to be understood that the terminology used herein is for the purpose of describing specific embodiments only and is not intended to be limiting. Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing the example embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the embodiments of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the invention.

Referring now to the drawings, FIGS. 1A-1E illustrates an example embodiment of a burner panel 100 having a cooling system 110. The burner panel 100 can be a burner panel for use inside a furnace such as an electric arc furnace. The burner panel 100 can include an outer enclosure 120. The outer enclosure 120 can enclose the internal components of the burner panel, such as the cooling system 110 and burner, and can insulate these components from the high temperatures of the furnace. Because the burner panel 100 can be exposed to high temperatures and it is preferrable for the burner panel 100 to be cooled by a cooling system such as cooling system 110. Cooling system 110 can be a cooling system that includes one or more cooling fluid pipes 112 and one or more discharge openings 114. The discharge openings 114 can be configured to discharge cooling fluid at atmospheric pressure. The cooling system 110 can include a first cooling fluid inlet 116 and a second cooling fluid inlet 118 in fluid communication with the cooling fluid pipes 112. Alternatively, the cooling fluid system 110 can include a first cooling fluid inlet 116. Alternatively, the cooling fluid system 110 can include a plurality of cooling fluid inlets. Alternatively, the cooling system can include one or more cooling fluid inlets and one or more cooling fluid returns in fluid communication with the cooling fluid pipes 112. For example, instead of having a first cooling fluid inlet 116 and a second cooling fluid inlet 118, the cooling system 110 can include a cooling fluid inlet and a cooling fluid return and the cooling fluid return can return cooling fluid that is not discharged out of the one or more discharge openings 114 to the cooling fluid source. The cooling system 110 can be connected to a cooling fluid source. For example, the first cooling fluid inlet 116 and second cooling fluid inlet 118 can receive cooling fluid from a cooling fluid source. Typically, the cooling fluid source may be, but is not limited to, a water source.

Figure 2A:
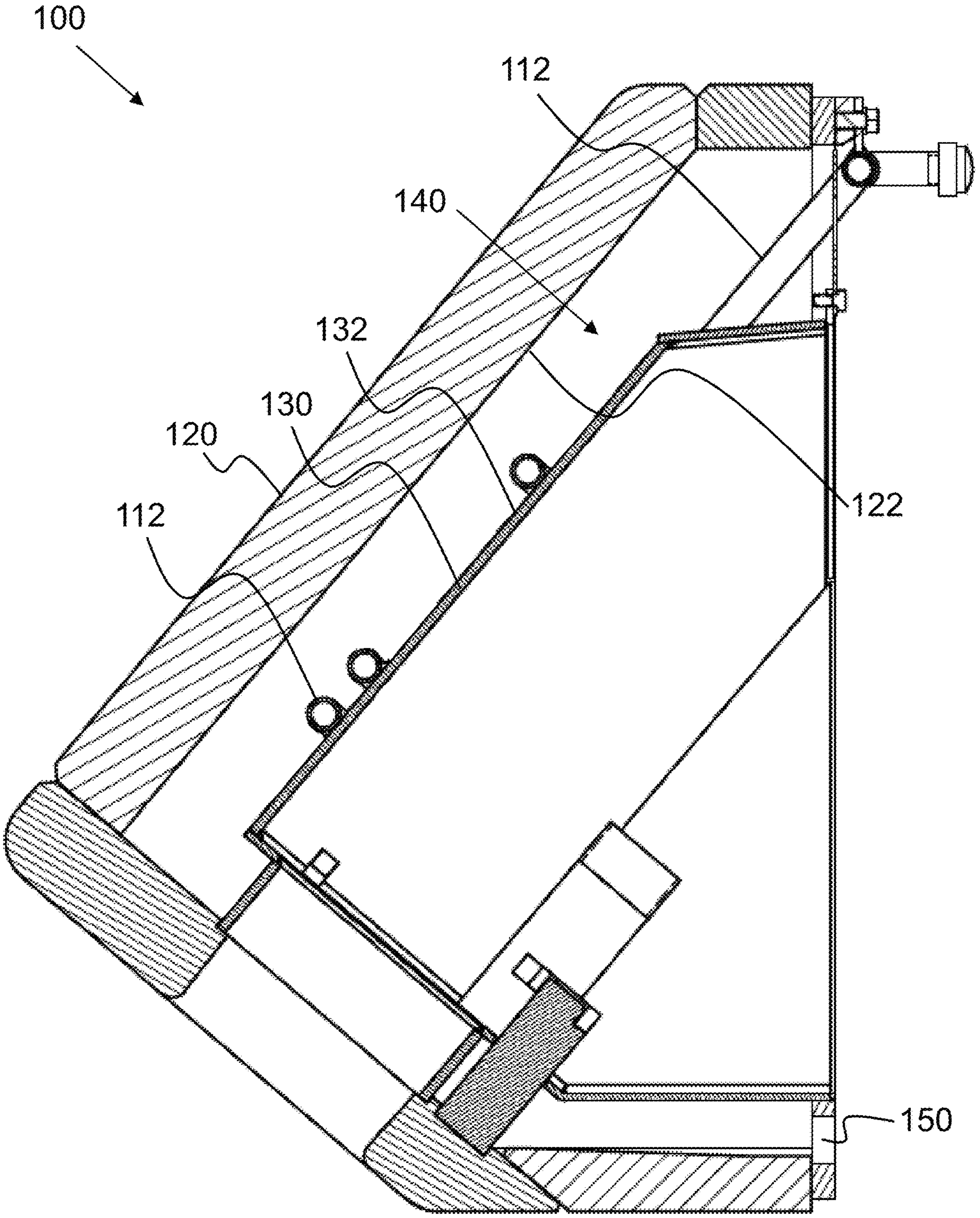
FIG. 2A is a cross-sectional side view of a burner panel, in accordance with an example embodiment of the presently disclosed subject matter.
Figure 2B:
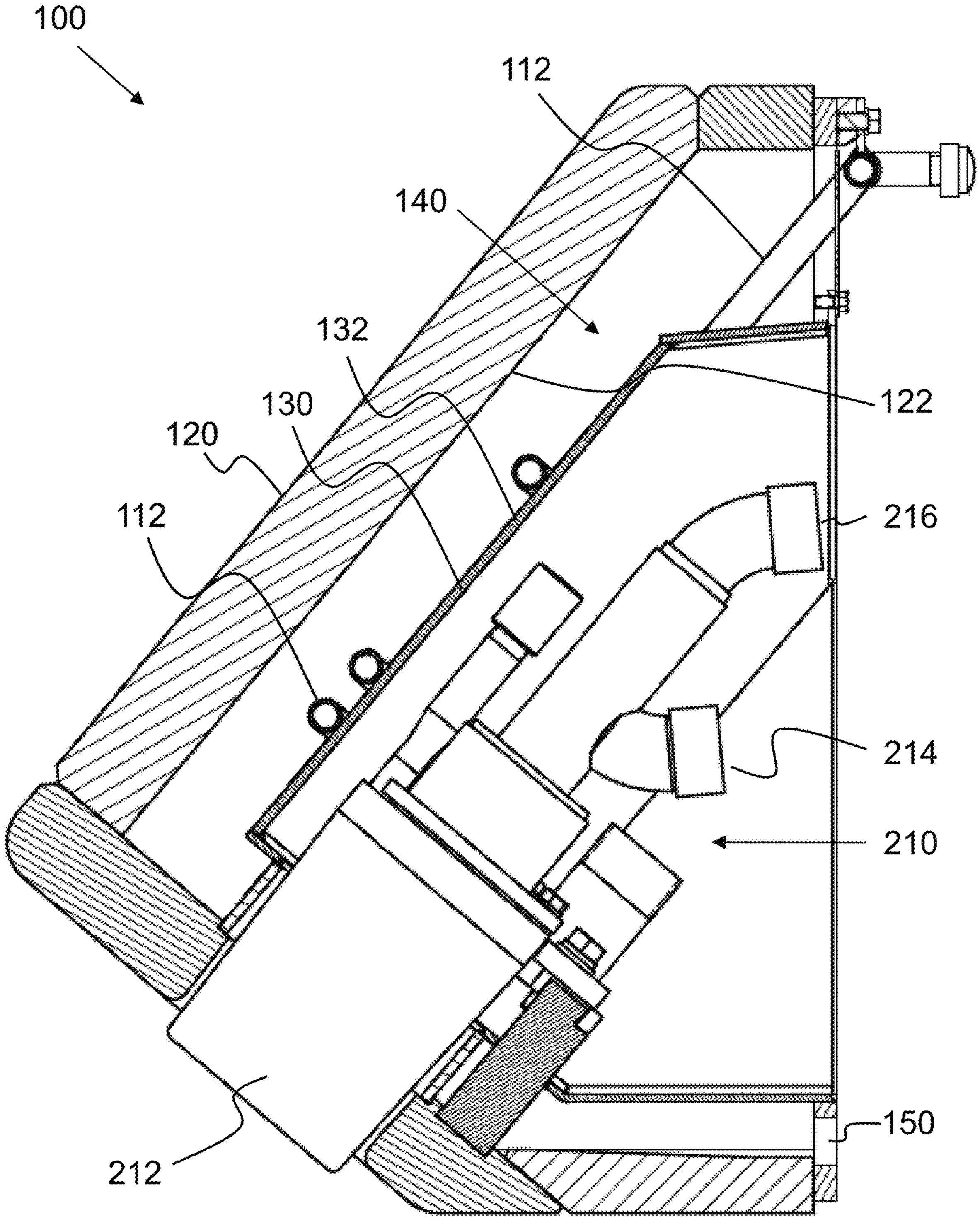
FIG. 2B is a cross-sectional side view of a burner panel, in accordance with an example embodiment of the presently disclosed subject matter.

The cooling system 110 can be disposed within the outer enclosure 120. In addition, the cooling system 110 can be disposed outside of a burner enclosure 130. The cooling system 110 can be disposed within a cooling cavity 140 disposed between the outer enclosure 120 and the burner enclosure 130. For example, as illustrated in FIGS. 2A and 2B, the burner panel 100 can be a box-in-box system wherein the burner enclosure 130 is disposed within the outer enclosure 120 and the cooling cavity 140 is defined by the inner surface 122 of the outer enclosure 120 and the outer surface 132 of the burner enclosure 130.

The discharge opening 114 can be an opening in the cooling fluid pipe 112. As illustrated in FIG. 1A, the discharge opening 114 can be a slot opening. For example, the discharge opening 114 can be a generally elongated opening, such as a rectangular, elliptical, or oval shaped slot formed in the cooling fluid pipes 112. The slot opening can have sharp corners, chamfer corners, fillet corners, circular corners, or any combination of the foregoing. As illustrated in FIG. 1A, the slot opening can extend for a portion of the cooling fluid pipe. Alternatively, or in addition, the slot openings can extend along generally the entire length of a section of cooling fluid pipe 112. For example, the slot opening can be continuous across a horizontal and/or vertical section of cooling fluid pipe. Alternatively, or in addition, the discharge opening 114 can be generally round, oval, elliptical, rectangular, or triangular.

The discharge openings 114 can be small openings that are closely spaced along the cooling fluid pipe 112. For example, the cooling fluid pipe 112 can be perforated pipe. Alternatively, or in addition, the cooling fluid pipe 112 can include sections of perforated pipe.

The total length of the one or more discharge openings 114 can extend along generally the entire length of the cooling fluid pipes 112. Alternatively, the total length of the one or more discharge openings 114 can extend along a proportion of the length of the cooling fluid pipes 112. For example, the one or more discharge openings 114 can, in total, extend along approximately 1% to 90% of the length of the cooling fluid pipe 112. Alternatively, or in addition, the one or more discharge openings 114 can, in total, extend along approximately 1% to 70% of the length of the cooling fluid pipe 112. Alternatively, or in addition, the one or more discharge openings 114 can, in total, extend along approximately 1% to 50% of the length of the cooling fluid pipe 112. Alternatively, or in addition, the one or more discharge openings 114 can, in total, extend along approximately 1% to 30% of the length of the cooling fluid pipe 112. Alternatively, or in addition, the one or more discharge openings 114 can, in total, extend along approximately 5% to 20% of the length of the cooling fluid pipe 112. Alternatively, or in addition, the one or more discharge openings 114 can, in total, extend along approximately 5% to 10% of the length of the cooling fluid pipe 112.

The discharge openings 114 can be configured to discharge a flow of cooling fluid, such as a stream, jet, waterfall, curtain, laminar flow, trickle, or drip of cooling fluid, as discussed further herein. The flow of cooling fluid can be generally continuous and/or coherent. For example, the cooling fluid discharged from the discharge openings 114 can remain generally coherent and/or together as opposed to fluid that is dispersed into droplets and/or atomized. The discharge openings 114 can be of sufficient size relative to the fluid pressure in the cooling fluid pipe 112 to create laminar, or substantially laminar flow, when the cooling fluid discharges out the cooling fluid pipe 112 through the discharge openings 114. Further, the discharge openings 114 can be adjustable such that the discharge flow of each of the discharge openings 114 can be individually adjusted to any of these discharge flows.

The discharge openings 114 can be configured to discharge a stream of cooling fluid out of the cooling fluid pipes. For example, cooling fluid can flow out of the discharge openings 114 as a generally continuous stream of fluid into the cooling cavity 140.

Alternatively, or in addition, the discharge openings 114 can be configured to discharge cooling fluid from the cooling fluid pipes 112 as a jet of cooling fluid. For example, the cooling fluid can flow out of the discharge openings as a coherent jet of fluid into the cooling cavity 140.

Alternatively, or in addition, the discharge openings 114 can be configured to discharge a waterfall and/or curtain of cooling fluid out of the cooling fluid pipes 112. For example, one or more discharged openings 114 can be configured to discharge a curtain of cooling fluid onto an inner surface of the cooling cavity 140. To achieve this, one or more discharge openings 114 can be positioned generally proximate the top of an inner surface of the cooling cavity 140 and can discharge an elongated stream of cooling fluid proximate the top of the inner surface such that the cooling fluid washes down the inner surface. For example, the discharge opening can be approximately the width of the inner surface such that the elongated stream of cooling fluid washes down across approximately the width of the inner surface. Alternatively, or in addition, one or more discharge openings 114 can be aligned in a generally straight configuration across the width of an inner surface to create a generally continuous curtain and/or waterfall of cooling fluid. Alternatively, or in addition one or more discharge openings 114 can be positioned generally proximate the side of an inner surface of the cooling cavity 140 and can discharge an elongated stream of cooling fluid proximate the side of the inner surface such that the cooling fluid washes across the inner surface. Alternatively, or in addition, one or more discharge openings 114 can be positioned generally proximate along a horizontal, vertical, or diagonal length of an inner surface of the cooling cavity 140 and can discharge cooling fluid proximate the length of the inner surface such that the cooling fluid washes across and/or down the inner surface.

Alternatively, or in addition, the discharge openings 114 can be configured to discharge the cooling fluid in a generally laminar flow. For example, the discharge openings 114 can be shaped and sized such that the discharge flow exits in a generally laminar manner. Alternatively, or in addition, the discharge openings 114 can include a laminar flow outlet or non-aerating outlet.

Alternatively, or in addition, the discharge openings 114 can be configured to discharge a trickle and/or drip of cooling fluid out of the cooling fluid pipes 112. For example, the cooling system 110 can include a plurality of closely spaced discharge openings 114 that each discharge a trickle and/or drip of cooling fluid onto an inner surface of the cooling cavity 140. The discharge openings 114 can be small holes that are closely spaced along the cooling fluid pipe 112. For example, the cooling fluid pipe 112 can be perforated pipe configured to trickle or drip cooling fluid out of the discharge openings. Alternatively, or in addition, the cooling fluid pipe 112 can include sections of perforated pipe.

The cooling system 110 can be configured to discharge cooling fluid on the inner surface 122 of the outer enclosure 120. For example, the cooling fluid can enter the cooling fluid pipe 112 through the first cooling fluid inlet 116 and second cooling fluid inlet 118 and can be directed to each discharge opening 114. The cooling fluid pipe 112 can provide a substantially equal flow of cooling fluid through each discharge opening 114. For example, the discharge openings 114 can be sized such that the flow rate through each discharge opening 114 remains relatively constant along the run of cooling fluid pipes 112. As will be appreciated, cooling fluid pressure can be lower at discharge openings 114 located further from the first cooling fluid inlet 116 and/or second cooling fluid inlet 118 when compared to discharge openings 114 located closer to the first cooling fluid inlet 116 and/or second cooling fluid inlet 118. To achieve relatively consistent flow through the discharge openings 114 despite this difference in pressure, the discharge openings 114 can be sized smaller at locations closer to the first cooling fluid inlet 116 and/or second cooling fluid inlet 118 and get larger as the distance from the first cooling fluid inlet 116 and/or second cooling fluid inlet 118 increased. Alternatively, the discharge openings 114 can be sized the same. Alternatively, water flow may be customized for each discharge opening 114 or for groups of discharge openings 114. Each discharge opening 114 can be sufficiently aligned with a respective portion of the inner surface 122 of the outer enclosure 120 such that the cooling fluid is directed onto the inner surface 122 of the outer enclosure 120. The discharge openings 114 can be arranged throughout the cooling cavity 140 such that the cooling fluid can be discharged evenly on substantially all the inner surface 122 of the outer enclosure 120. Alternatively, the discharge openings 114 can be configured to concentrate the discharge of cooling fluid on specific areas, such as known hot spots, on the inner surface 122 of the outer enclosure 120. Alternatively, or in addition, the discharge openings 114 can be configured to discharge cooling fluid on the outer surface 132 of the burner enclosure 130. The discharge openings 114 may be adjustable to meet cooling demands. For example, the discharge direction, cooling fluid flow rate, discharge pattern, and location of the discharge opening 114 may each be adjustable or customizable to meet a particular cooling demand.

The discharge openings 114 can be disposed at any angle around the circumference of the cooling fluid pipes. In addition, a plurality of discharge openings 114 can be disposed around the same section of cooling fluid pipe 112. For example, as illustrated in FIG. 1A, a plurality of discharge openings 114 can be disposed proximate ends 112*a* of sections of cooling fluid pipe 112. The discharge openings 114 can be disposed generally evenly around the circumference of the cooling fluid pipe 112. Alternatively, or in addition, discharge openings 114 can be staggered wherein a portion of the discharge opening 144 overlaps with an adjacent discharge opening and wherein the overlapping discharge openings are disposed at different angles around the circumference of the cooling fluid pipe 112.

Alternatively, or in addition, the discharge openings can be spaced apart across one or more sections of cooling fluid pipe 112. The discharge openings 114 can be generally evenly spaced across a section of cooling fluid pipe 112. For example, as illustrated in FIG. 1A, a plurality of discharge openings 114 can be disposed generally evenly across a horizontal cooling fluid pipe section 112*b*. Alternatively, or in addition, discharge openings 114 can be non-evenly spaced along a section of cooling fluid pipe. For example, discharge openings 114 can be more closely spaced in certain areas, such as known hot spots, where more cooling fluid may be required and then more spaced out in certain areas where less cooling fluid is required.

The discharge openings 114 can be configured to direct the discharge of the cooling fluid such that a majority of the cooling fluid is discharged onto the inner surface 122 of the outer enclosures 120. For example, the discharge openings

114 can be configured to discharge approximately 100% of the cooling fluid discharged by the cooling system 110 onto the inner surface 122 of the outer enclosure 120. Alternatively, the discharge openings 114 can be configured to discharge approximately 90% of the cooling fluid discharged by the cooling system 110 onto the inner surface 122 of the outer enclosure 120 and approximately 10% of the cooling fluid discharged by the cooling system 110 onto the outer surface 132 of the burner enclosure 130. Alternatively, the ratio of cooling fluid discharged onto the onto the inner surface 122 of the outer enclosure 120 to cooling system 110 onto the outer surface 132 of the burner enclosure 130 can be approximately 80%/20%, 70%/30%, 60%/40%, 50%/50%, 40%/60%, 30%/70%, 20%/80%, 10%/90%, or 0%/100%. Alternatively, the discharge openings 114 can be configured to discharge approximately 70% to 100% of the cooling fluid discharged by the cooling system 110 onto the inner surface 122 of the outer enclosure 120 and approximately 0% to 30% of the cooling fluid discharged by the cooling system 110 onto the outer surface 132 of the burner enclosure 130. Alternatively, the discharge openings 114 can be configured to discharge approximately 80% to 100% of the cooling fluid discharged by the cooling system 110 onto the inner surface 122 of the outer enclosure 120 and approximately 0% to 20% of the cooling fluid discharged by the cooling system 110 onto the outer surface 132 of the burner enclosure 130. Alternatively, the discharge openings 114 can be configured to discharge approximately 90% to 100% of the cooling fluid discharged by the cooling system 110 onto the inner surface 122 of the outer enclosure 120 and approximately 0% to 10% of the cooling fluid discharged by the cooling system 110 onto the outer surface 132 of the burner enclosure 130.

The discharge openings 114 can have one or more discharge patterns 115. For example, the discharge openings 114 can be configured to discharge a flow of cooling fluid in any shape or pattern, such as a generally flat, elongated, rectangular, triangular, or circular pattern. For example, as illustrated in FIG. 1A, the discharge pattern 115 can be generally rectangular and flat as the cooling fluid flows out of the slot-shaped discharge openings shown in FIG. 1A. Further, the discharge openings 114 can be adjustable such that the discharge pattern 115 of each of the discharge openings 114 can be individually adjusted to any of these discharge patterns.

The discharge openings 114 can be configured such that the cooling fluid discharge out of the discharge openings 114 covers, or, in other words, comes in contact with, approximately 100% of the inner surface 122 of the outer enclosure 120. Alternatively, the discharge openings 114 can be configured to provide coverage over approximately 80% to 100% of the inner surface 122 of the outer enclosures 120. Alternatively, the discharge openings 114 can be configured to provide coverage over approximately 90% to 100% of the inner surface 122 of the outer enclosures 120. Alternatively, the discharge openings 114 can be configured to provide coverage over approximately 90%, 80%, 70%, 60%, 50%, 40%, 30%, 20%, or 10% of the inner surface 122 of the outer enclosure 120. Alternatively, or in addition, the discharge openings 114 can be configured to provide coverage over approximately 100% of the outer surface 132 of the burner enclosure 130. Alternatively, the discharge openings 114 can be configured to provide coverage over approximately 80% to 100% of the outer surface 132 of the burner enclosure 130. Alternatively, the discharge openings 114 can be configured to provide coverage over approximately 90% to 100% of the outer surface 132 of the burner enclosure 130. Alternatively, the discharge openings 114 can be configured to provide coverage over approximately 90%, 80%, 70%, 60%, 50%, 40%, 30%, 20%, or 10% of the outer surface 132 of the burner enclosure 130. Alternatively, or in addition, the discharge openings 114 can be configured to have overlapping, or partially overlapping coverage. For example, this can be done to ensure total coverage of the inner surface 122 of the outer enclosure 120, the outer surface 132 of the burner enclosure 130, both, or portions of either surface.

The cooling system 110 can be configured to have a total flow rate of approximately 48 GPM. The cooling system 110 can have a total flow rate of approximately 40 GPM to 60 GPM. Alternatively, the cooling system 110 can have a total flow rate of approximately 45 GPM to 50 GPM. Alternatively, the cooling system 110 can be configured to have a total flow rate of approximately 47 GPM, 46 GPM, 45 GPM, 40 GPM, 35 GPM, 30 GPM, 25 GPM, 20 GPM, 15 GPM, 10 GPM, or 5 GPM. Alternatively, the cooling system 110 can be configured to have a total flow rate of approximately 49 GPM, 50 GPM, 55 GPM, 60 GPM, 65 GPM, 70 GPM, 75 GPM, 80 GPM, 85 GPM, 90 GPM, 95 GPM, 100 GPM, or 200 GPM. The flow rate through each of the discharge openings 114 can be configured to be approximately 2 GPM to 5 GPM. Alternatively, the flow rate through each of the discharge openings 114 can be configured to be approximately 3 GPM to 4 GPM. Alternatively, the flow rate through each of the discharge openings 114 can be configured to be approximately 2 GPM or 1 GPM. Alternatively, the flow rate through each of the discharge openings 114 can be configured to be approximately 5 GPM, 6 GPM, 7 GPM, 8 GPM, 9 GPM, 10 GPM, 15 GPM, or 20 GPM. The total flow rate can be up to but not exceeding the drain rate. The drain rate can be the flow rate exiting the cooling cavity 140 through the drain 150 as described further herein.

Figure 4:
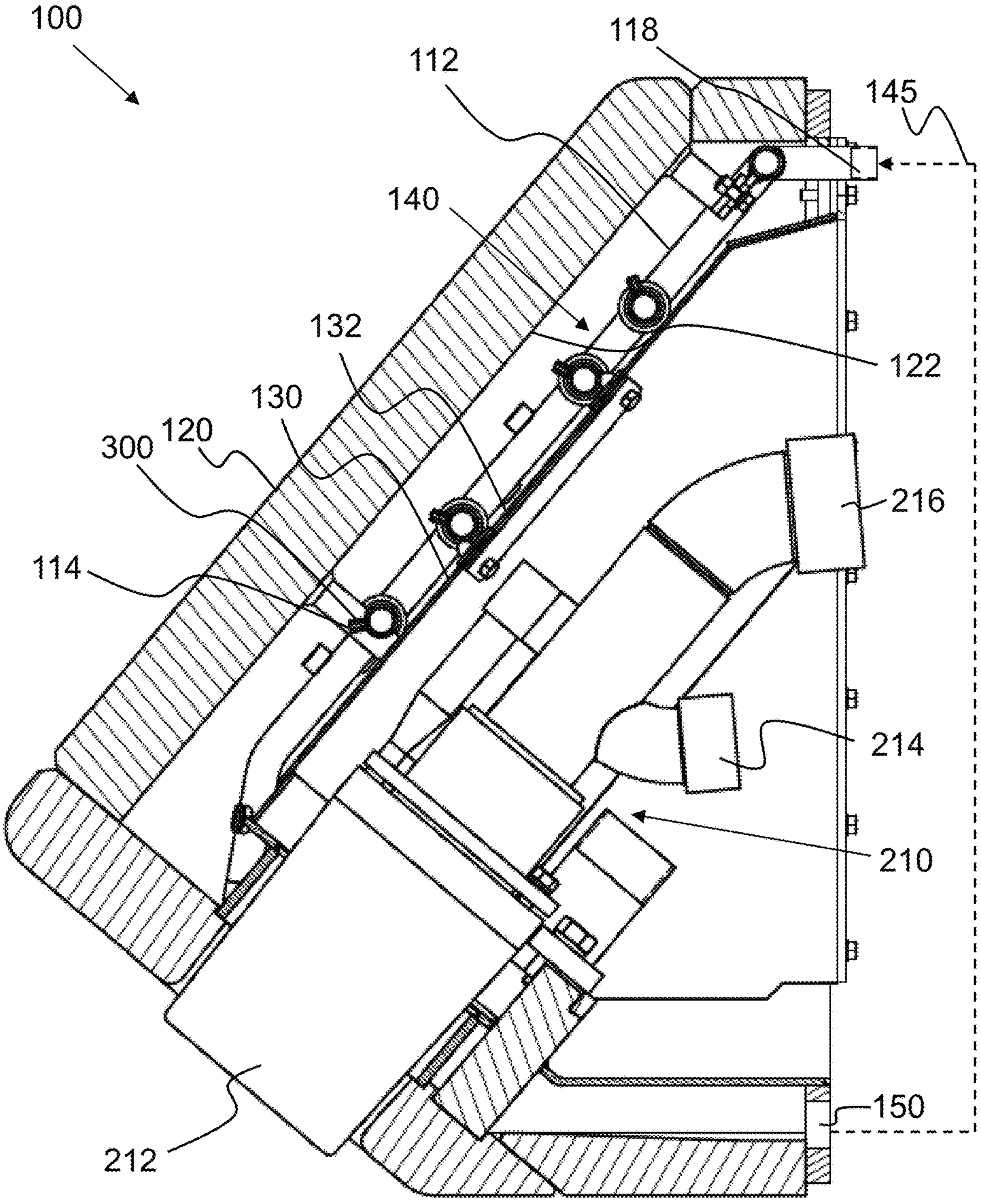
FIG. 4 is a cross-sectional side view of a burner panel, in accordance with an example embodiment of the presently disclosed subject matter.

In operation, the cooling fluid, discharged from the discharge openings 114, contacts the inner surface 122 of the outer enclosure and cools the outer enclosure 120. Alternatively, or in addition the cooling fluid, discharged from the discharge openings 114, can contact the outer surface 132 of the burner enclosure 130. The cooling fluid then drains through the cooling cavity 140 toward the cooling fluid retention system 145 (as shown in FIG. 4). For example, the cooling fluid may exit the cooling cavity 140 through the drain 150. The drain 150 can be a gravity drain. Alternatively, or in addition, the drain can be negatively pressured in relation to the cooling cavity 140. The drain 150 can be in fluid communication with the cooling fluid retention system 145 such that the cooling fluid is captured and can be recirculated. For example, the drain 150 can be in fluid communication with the main furnace cooling return line collector. The cooling fluid can drain out of the drain 150 to the main furnace cooling return line collector and can then be recirculated. For example, the cooling fluid can be recirculated through the inlet pressure line. Alternatively, or in addition, the cooling fluid may be discarded after it is discharged by the cooling system 110.

FIG. 2B shows a burner 210 with a combustion chamber 212 installed in a furnace. The burner 210 may be used to direct additional heat to specific spots in a furnace. The burner 210 can be a low-pressure burner. Alternatively, the burner 210 can be a high-pressure burner. An exemplary burner 210 for use with the present invention receives fuel and oxygen through a fuel inlet 214 and an oxygen inlet 216 and mixes the fuel and oxygen for combustion in the combustion chamber 222. Since the burner 210 is enclosed in burner enclosure 130 and the outer enclosure 120, which is preferably water cooled, it is largely insulated from the intense heat of the furnace. However, the combustion chamber 212 of the burner 210 is mounted such that it protrudes through an opening in the outer enclosure 120 so that it can inject a flame toward the melt in the furnace. Thus, the combustion chamber 212 is exposed to heat generated by the burner 210 as well as heat radiated in the furnace. Accordingly, the combustion chamber 212 may require cooling to prevent it from being damaged by the heat. The combustion chamber 212 can be cooled by a conventional pressurized cooling system wherein cooling fluid flows in through an inlet, around the combustion chamber 212, and out through an outlet. Alternatively, or in addition, the cooling system 110 can be configured to provide cooling to the combustion chamber 212. For example, the cooling system 110 can be configured to discharge cooling fluid, discharged from the discharge openings 114, on at least a portion of the outer surface 132 of the burner enclosure 130 adjacent to the combustion chamber 212 such that heat is transferred from the combustion chamber 212 to the burner enclosure 130 and then to the cooling fluid, therefore cooling the combustion chamber 212. Alternatively, or in addition, the cooling system 110 can be configured to discharge cooling fluid, discharged from the discharge openings 114, on at least a portion of the outer surface of the combustion chamber 212.

Figure 3:
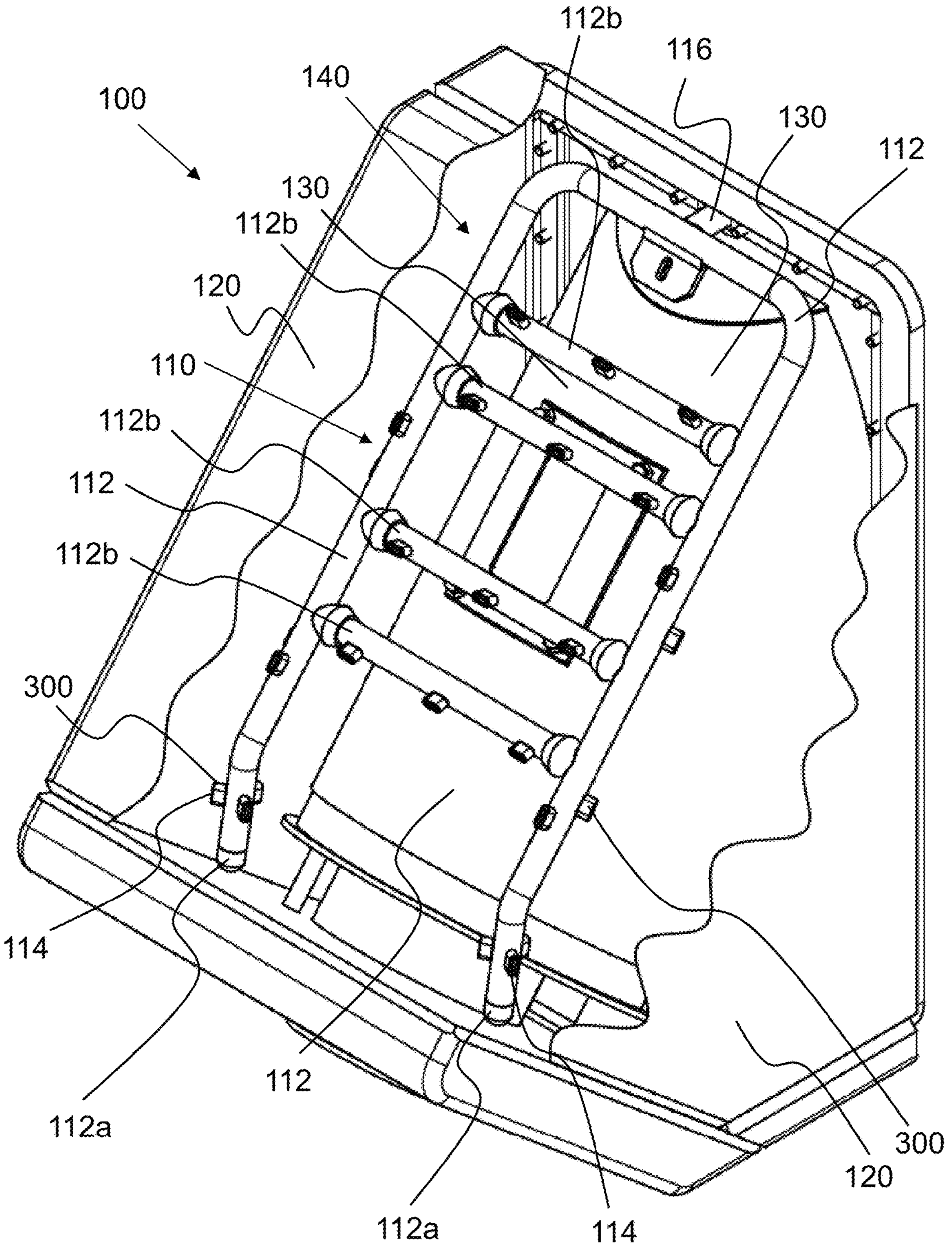
FIG. 3 is a cutaway view of a burner panel, in accordance with an example embodiment of the presently disclosed subject matter.

FIGS. 3 and 4 show a burner panel 100 having a cooling system 110 including one or more slotted extensions 300. For example, the one or more discharge openings 114 can include a slotted extension 300. The slotted extension 300 can be a protrusion extending outward from the cooling pipe 112. The slotted extension 300 can define a slot-shaped tube wherein the cooling fluid flows out of the cooling pipe through the slot-shaped tube and out of the discharge opening 114. Alternatively, or in addition, the slotted extension 300 can define a tube of any shape, including any shape to match the shape of the discharge opening 114. The slotted extension 300 can extend a length outward from the cooling pipe 112. For example, the slotted extension 300 can be between approximately 0.1 in. and 5 in. Alternatively, the slotted extension can be between approximately 0.1 in. and 3 in. Alternatively, the slotted extension can be between approximately 0.5 in. and 2 in. Alternatively, the slotted extension can be between approximately 0.5 in. and 1 in. Alternatively, the slotted extension can be approximately 0.75 in.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A burner panel comprising:

an outer enclosure having an outer surface and an inner surface;

a burner enclosure disposed at least partially within the outer enclosure and having an outer surface and an inner surface, wherein the outer surface of the burner enclosure and the inner surface of the outer enclosure define a cooling cavity;

a cooling system disposed at least partially within the cooling cavity, the cooling system comprising:

a cooling fluid piping system in fluid communication with a cooling fluid inlet;

one or more discharge openings comprising a slotted extension protruding from the cooling fluid piping system and defining a slot-shaped tube in fluid communication with the cooling fluid piping system, the one or more discharge openings configured to discharge a cooling fluid on at least a portion of the inner surface of the outer enclosure;

a drain; and a cooling fluid retention system in fluid communication with the drain, wherein the cooling fluid discharged by the one or more discharge openings flows out of the cooling cavity through the drain to the cooling fluid retention system; and a burner disposed at least partially within the burner enclosure, the burner comprising:

a combustion chamber;

a fuel inlet; and an oxygen inlet.

* * * * *